United States Patent [19]

Abthoff et al.

[11] Patent Number: 4,667,469
[45] Date of Patent: May 26, 1987

[54] EXHAUST GAS FILTER FOR DIESEL ENGINES

[75] Inventors: Joerg Abthoff, Pluederhausen; Hans-Dieter Schuster, Schorndorf; Gunter Loose, Remseck; Bernhard Jokl, Neuhausen, all of Fed. Rep. of Germany

[73] Assignee: Daimler-Benz Aktiengesellschaft, Fed. Rep. of Germany

[21] Appl. No.: 805,691

[22] Filed: Dec. 6, 1985

[30] Foreign Application Priority Data

Dec. 6, 1984 [DE] Fed. Rep. of Germany ....... 3444472

[51] Int. Cl.$^4$ .......................................... B01D 39/20
[52] U.S. Cl. ...................................... 60/311; 55/523; 422/180
[58] Field of Search .................... 60/311, 303; 55/523; 422/180

[56] References Cited

U.S. PATENT DOCUMENTS 4,519,820  5/1985  Oyobe ................................... 60/303
4,531,363  7/1985  Ludecke ............................... 55/523

FOREIGN PATENT DOCUMENTS 0086367  1/1983  European Pat. Off. .
3311724 10/1984  Fed. Rep. of Germany .

Primary Examiner—Douglas Hart
Attorney, Agent, or Firm—Barnes & Thornburg

[57] ABSTRACT

An exhaust gas filter for Diesel engines that consists of a filter block made of a porous ceramic material, and a plurality of ducts extending through said filter block that extend in the flow direction of the exhaust gases. The ducts in each case are alternately closed at their upstream or their downstream end, whereby the exhaust gases are forced to penetrate a filtering separating wall between two ducts. The closing means at the downstream end, are arranged so that they are staggered with respect to one another in the flow direction; in particular they are staggered by about 5 to 150 mm. The staggered arrangement of the closing means reduces the danger of a thermal damage to the filter block during the burning-off of the deposited soot.

4 Claims, 2 Drawing Figures

EXHAUST GAS FILTER FOR DIESEL ENGINES

BACKGROUND AND SUMMARY OF THE INVENTION

Exhaust gas filters for Diesel engines have the purpose of filtering the soot out of the exhaust gas of the Diesel engines. The emission of soot from Diesel engines is undesirable because the surface of the soot particles contains small amounts of adsorbed substances, some of which, in high concentrations, are considered harmful to human health The soot filters for Diesel engines conventionally consist of a monolith of porous ceramic material which consists of thin-walled ducts that are parallel to one another and are positioned along its whole length in the flow direction of the exhaust gas. These ducts are alternately closed at the upstream or the downstream end. The ducts are frequently alternately opened or closed in a checkerboard pattern so that each duct has an open and a closed end. Alternatively, in a manner similar to the production of corrugated cardboard, the filter may be wound in a spiral shape to form a gas-permeable packet In this case, the covering of the individual ducts is no longer only constructed in the manner of a chessboard but is also spiral-shaped.

When the Diesel emissions are led through this type of filter, the exhaust gas that enters through the ducts which are open on the inlet side is forced to flow laterally through the porous duct walls into the adjacent ducts which are open on the outlet side. In this case, the soot particles that can no longer pass through the duct walls accumulate in the ducts that are open upstream. When a certain ignition temperature is reached and when a sufficient oxygen concentration exists in the exhaust gas, the accumulated soot burns off and the filter is regenerated. Between two regeneration processes of this type, there is a considerable rise in exhaust gas counterpressure with increased loading of the filter. In the case of an especially high load, the burning-off of soot becomes very intense. Since a large part of the soot and the foreign substances accumulates in front of the closing means of the ceramic body on the outlet side, very high temperatures occur there which may become so high that the melting point of the ceramic material is exceeded and the filter is destroyed.

The objective of this invention consists of finding an exhaust gas filter for Diesel engines made of a porous ceramic material where the danger of a destruction of the filter through the burning-off of soot is largely avoided:

This objective is achieved by structuring a monolithic filter block made of a porous ceramic material having a plurality of ducts extending in the flow direction of the exhaust gases, wherein the ducts are alternately closed at the upstream or the downstream end, and wherein the closing means of the flow ducts at the downstream end in the flow direction, are staggered with respect to one another.

It was found by means of this staggering of the closing means of the flow ducts at the down stream end, a better distribution of the heat occuring during the burning-off of soot is possible. Due to the more even distribution of heat, damage to the filter material is largely avoided.

Other objects, advantages and novel features of the present invention will become apparent from the following detailed description of the invention when considered in conjunction with the accompanying drawings.

DETAILED DESCRIPTION OF THE DRAWINGS

Figure 1:
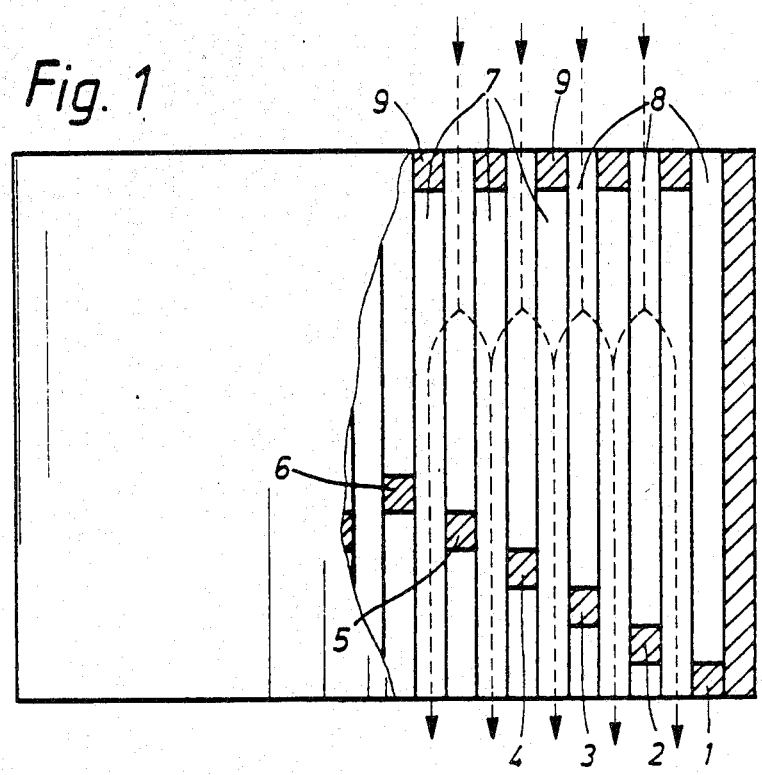
FIG. 1 is a longitudinal partial sectional view through having staggered closing plugs at the exhaust gas outlet.

FIG. 1 is a partial longitudinal sectional view through an exhaust gas filter including a plurality of ducts 7 and 8. Ducts with reference numeral 7 are closed by a plug 9 at the gas inlet end of the filter. Ducts with the reference numeral 8 are closed by the plugs 1 to 6 at the gas outlet end of the filter. FIG. 1 shows the number of plugs and the position of the plug in space.

The plugs 1 to 6 are staggered with respect to one another along the length of the flow direction The flow direction is indicated by the dashed arrows. Thus, fluid enters through ducts 8 on the inlet side of the filter, travels through the walls between the ducts into ducts 7 and out through ducts 7 on the onlet side of the filter. Other preferred embodiments include an arrangement of the staggered plugs that is different from the one shown here.

Figure 2:
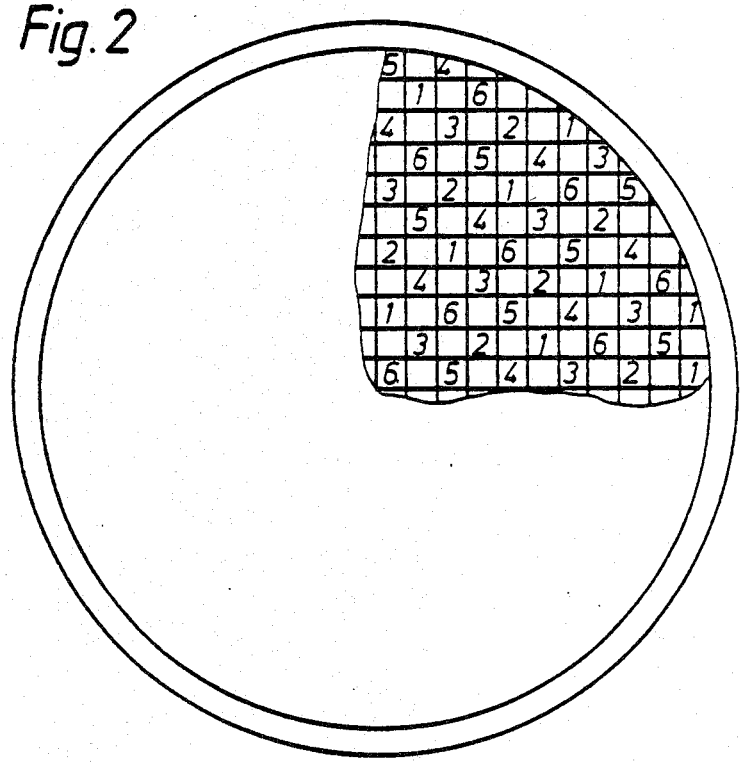
FIG. 2 is a diagram of a view of the face of the filter on the side of the exhaust gas outlet where the arrangement of the closing plugs is partially shown in a quadrant.

FIG. 2 in diagram form is a view of the face of the filter on the outlet side. The ducts that are closed on the outlet side are shown in part in a quadrant. The areas that have the reference number 1 to 6 in this case each signify a Plug closing a duct 8 at its outlet end closed duct, the plug being located at the level indicated under the corresponding number in FIG. 1.

Conventional ceramic monoliths are used for the filters, the production of which is generally known and which are available in various constructions by the industry. When looking at the face of a filter block of this type shown in FIG. 2, it is found that the number of ducts extending in the flow direction of the exhaust gases is between approximately 0.5 and 100 ducts per $cm^2$ of the face. The wall thickness between the ducts is approximately 0.5 and 100 ducts per $cm^2$ of the face. The wall thickness between the ducts is approximately between 0.3 and 0.7 mm, and the porosity of the ceramic material is usually between 35 and 55% in the case of a mean pore diameter of about 10 to 35 micrometers. The closing means of the ducts may, for example, consist of plugs made of a ceramic mass. A ceramic mass consisting of talc and water glass has shown good results and can be introduced easily into the ducts in the form of a paste.

It was also found to be especially advantageous when the closing means at the downstream end in the flow direction are staggered with respect to one another by about 5 to 150 mm, which corresponds approximately to the length of a plug. This spacing is desireable because when the staggered distance in the flow direction become wider, the utilization of the volume of the filter block becomes worse. On the other hand, when the staggering is not wide enough, the danger increases that the ceramic material will be damaged by the heat occurring during the burning-off. The staggering of the closing means at the downstream end with respect to one another may also be achieved by introducing plugs of a differing length into the flow ducts. Alternatively, differing quantities of the ceramic mass may be introducted into the ducts to be closed.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. An exhaust gas filter for a diesel engine comprising a filter block made of a porous ceramic material having a plurality of ducts extending in the main flow direction of the exhaust gases, and closing means for closing said ducts alternately at their upstream and at their downstream end, wherein the closing means located at the downstream end are staggered with respect to one another in the main flow direction.

2. An exhaust gas filter according to claim 1, said closing means comprising plugs, wherein the staggered distance between each plug is approximately 5 to 150 mm.

3. An exhaust gas filter according to claim 2, wherein the plugs have an approximately uniform length.

4. An exhaust gas filter according to claim 2, wherein the plugs have differing lengths within a range of 5 to 150 mm.

* * * * *